(12) United States Patent
Blumberg

(10) Patent No.: US 6,722,886 B2
(45) Date of Patent: Apr. 20, 2004

(54) BEHAVIOR MODIFICATION DEVICE

(76) Inventor: Samuel H. Blumberg, 2305 Valley Ave., Wilmington, DE (US) 19810

( * ) Notice: Subject to any disclaimer, the term of this patent is extended or adjusted under 35 U.S.C. 154(b) by 163 days.

(21) Appl. No.: 10/046,369

(22) Filed: Jan. 14, 2002

(65) Prior Publication Data

US 2003/0207240 A1 Nov. 6, 2003

(51) Int. Cl.⁷ .............................................. G09B 19/00
(52) U.S. Cl. ..................................... 434/236; 434/238
(58) Field of Search ................................ 434/236, 237, 434/238; 273/280, 117, 139

(56) References Cited

U.S. PATENT DOCUMENTS

| | | | |
|---|---|---|---|
| 3,986,136 A | | 10/1976 | Hurlburt |
| 5,470,235 A | | 11/1995 | Papaleo |
| 5,573,405 A | | 11/1996 | Evans |
| 5,931,467 A | * | 8/1999 | Kamille ..................... 273/139 |
| 5,954,512 A | | 9/1999 | Fruge |
| 6,540,229 B1 | * | 4/2003 | Smith et al. ................ 273/274 |

OTHER PUBLICATIONS

US 2002/0165021 A1, Several E., Nov. 2002.*

* cited by examiner

*Primary Examiner*—Derris H. Banks
*Assistant Examiner*—Dmitry Suhol

(57) ABSTRACT

A device schedules administration of reinforcing rewards consistent with a psychological behavior modification program. The instructions to grant rewards are randomized in response to the subject successfully executing targeted behavior thus making the reinforcement unpredictable to the individual being treated. The device has a base with an indicating surface on which code marks are placed in predetermined locations. The code marks are encoded with respect to instructions to grant or deny a reinforcement. The device also has an opaque mask coextensive with the indicating surface. The mask includes an aperture with an initially closed cover to conceal the code marks from view of the individual. At appropriate time, the cover is opened to reveal the code mark so that the individual can follow instructions whether or not to receive a reward. The device is light weight, portable, convenient to carry and easy to use by the individual.

14 Claims, 5 Drawing Sheets

BEHAVIOR MODIFICATION DEVICE

FIELD OF THE INVENTION

This invention relates to a device for implementing behavior modification utilizing reward and reinforcement psychology principles. More specifically, it relates to a device that schedules rewards on a randomized basis to reinforce the desired behavior modification treatment of a psychologist's patient.

BACKGROUND OF THE INVENTION

In the field of psychology, patients sometimes present undesirable behavior traits. The inducement for the patient to change to a favorable behavior mode can be strengthened by the grant of rewards, also called "reinforcements". That is, when individuals are given a reinforcement after executing a specific, targeted behavior, the frequency of the targeted behavior is likely to increase.

Psychologists have demonstrated the speed of learning a behavior tends to increase when reinforcements are awarded predictably. For example, if a reinforcement is provided every time the subject completes a targeted behavior event, i.e., when the ratio of rewards to desired events 1:1, the learning rate is usually high. The learning rate is also normally high when the reward to desired event ratio is another predictable, fixed value. However, targeted behavior quickly ceases after a program of predictable reinforcement administration stops. When reinforcements are provided in an unpredictable manner such as after random numbers of targeted behavior events, individuals learn to produce the targeted behavior more slowly, but the learning of the targeted behavior mode tends to continue long after the reinforcements are stopped.

In a reinforcement based behavior modification program, it is often difficult for the individual being treated to know when to receive a reinforcement or to keep track of reinforcement-triggering activities. Mechanical devices have been developed to generate an indication when a reinforcement should be given. Conventional devices for this purpose only provide indications for a fixed ratio of reinforcements to targeted behavior events. It would be desirable to have a device that schedules reinforcements on an unpredictable basis, such as after a random number of targeted behavior events.

In a randomized reinforcement behavior modification program, the individual or patient does not know in advance which specific demonstrated targeted behavior will result in a reinforcement. The ideal reward to event frequency in a behavior modification program can depend on an individual's characteristics and the behavior being modified. In addition to having a mechanical device that grants reinforcements on a randomized basis, it is further desirable to provide the user with control over the reward to event frequency to better match individuals with their ideal reinforcement schedule.

SUMMARY OF THE INVENTION

Accordingly, the present invention provides a device for scheduling administration of reinforcements in a behavior modification program in response to an individual completing an event identified by a sequence number in a series of events, the device comprising:

a base having an indicating surface;

a plurality of code marks, each code mark being positioned at a location on the indicating surface uniquely corresponding to the sequence number of one event in the series; and a mask comprising an opaque material covering the indicating surface, in which the mask is operative to reveal each code mark consecutively in order of the sequence number of the event in the series corresponding to each respective code mark; and in which each code mark indicates an instruction that is unpredictable by the individual prior to revelation whether to grant or deny a reinforcement.

There is also provided a system for scheduling administration of reinforcements in a behavior modification program in response to an individual completing an event identified by a sequence number in a series of events, the system comprising:

a set of interchangeable bases, each base having an indicating surface;

a plurality of code marks on each indicating surface of each base in the set, each code mark being positioned at a location on the indicating surface of the base uniquely corresponding to the sequence number of one event in the series; and a mask comprising an opaque material adapted to removably attach to each base, the mask defining at least one aperture of size and position on the mask to reveal by visual inspection of the mask at most one code mark, the mask further being operative to sequentially reveal each code mark corresponding to the sequence number of each event in the series;

in which each code mark indicates an instruction to grant or deny a reinforcement as a result of the individual completing the event identified by the sequence number corresponding to the instruction, in which the instructions to grant a reinforcement are randomized in order relative to the sequence numbers; and in which the code marks for each base in the set provides a randomized order of reinforcements different from other bases in the set.

DETAILED DESCRIPTION OF THE INVENTION

Figure 1:
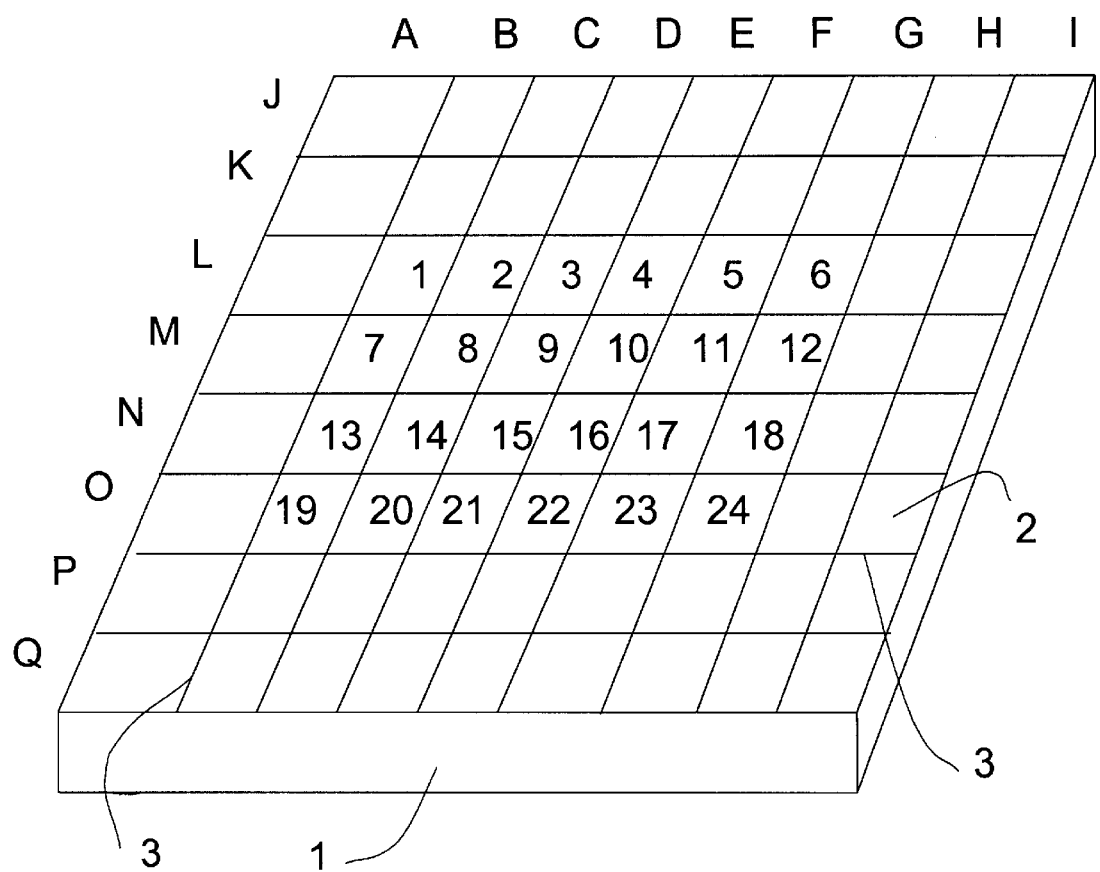
FIG. 1 is a perspective view of a base of an embodiment according to this invention.

The present invention pertains to an inexpensive, portable, light weight and easy to use device that is suited to schedule the timing of delivery of reinforcements during a program of psychological behavior modification. Such a program is usually designed and controlled by a competently trained supervisor, who often, but not necessarily is a professional psychologist (hereinafter, the "psychologist"). The psychologist can manipulate the reinforcement scheduling device for the individual being treated (hereinafter, "the patient") but the device is simple enough to be operated by the patient. Also, usually with guidance from a psychologist and depending on the ability of the person involved, the patient can modify the schedule of reinforcements, magnitude and frequency.

This device is intended to be used in connection with a standard reinforcement type behavior modification program. Such a program from time to time challenges the patient to engage in an activity presenting the opportunity to either perform in the previously habitual undesirable manner or to adopt the favored, targeted behavior pattern. Generally reinforcement programs attempt to influence the speed and persistence of behavior modification by giving the individual a reward after the patient foregoes the traditional mode and instead successfully completes a targeted behavior event.

The novel device implements randomized reinforcement delivery schedule that grants rewards in a manner that is unpredictable to the patient. That is, the device schedules the patient to receive a reward after the patient executes a random number of events that conform to the targeted behavior. The patient thus does not know in advance whether the next successful execution will result in the grant of a reward.

A variety of methods can be used to randomize the schedule of awards in a behavior modification program. For example, a randomized method of reward scheduling can be implemented with an algorithm as follows.

1. Patient challenged to perform next activity.
2. If patient fails to demonstrate targeted behavior return to step 1, otherwise proceed to next step.
3. Generate random number between 1 and 100 using pseudo-random number generating or true random number generating techniques. Proceed to next step.
4. If random number is less than a cut off parameter, e.g., 50, deny reinforcement and return to step 1, otherwise, proceed to next step.
5. Random number equals or exceeds the cut off parameter, grant reinforcement and return to step 1.

In accordance with this algorithm, the determination to reward the patient after any particular demonstration of targeted behavior occurs randomly at a probability determined by the value of the cut off parameter. In the example algorithm above, the probability was 0.5. The overall reward to targeted event frequency, that is the ratio of number of rewards given to number of targeted events completed will depend on the value selected for the cut off parameter. Hence, rewards per event will become much more frequent if the cut off parameter is lowered, for example to 25 in the above algorithm. That is, with the cut off parameter at 50, on average, a reward would result after the patient executes one of every two successful events and with the parameter at 25, a reward should be given after three of every four such events.

In an optional variation the novel device can be configured to also schedule the amount of a reinforcing reward. The psychologist of the behavior modification program can thus set up the device to indicate that a standard size, a fraction of standard size, multiples of standard size or variable size reinforcements will be awarded after randomized numbers of targeted behavior events are completed. For example, by utilizing the following algorithm multiple scale rewards can be granted.

1. Patient challenged to perform next activity.
2. If patient fails to demonstrate targeted behavior return to step 1, otherwise proceed to next step.
3. Generate random number between 1 and 100 using pseudo-random number generating or true random number generating techniques. Proceed to next step.
4. If random number is less than a cut off parameter, e.g., 50, deny reinforcement and return to step 1, otherwise, proceed to next step.
5. Patient qualified to receive a reinforcement. Size of reinforcement determined in subsequent steps.
6. If random number of step 3 exceeds an enhanced reinforcement cut off, e.g. 75, grant an enhanced reinforcement, such as double size of standard reward and return to step 1, otherwise, proceed to next step.
7. Random number of step 3 equals or exceeds the cut off parameter of step 4 but does not exceed enhanced reinforcement cut of value. Grant standard size reinforcement and return to step 1.

A second example algorithm for randomly scheduling an award to the patient is based upon the number of successful executions of targeted behavior that the patient must complete before an award is granted. According to this algorithm, the psychologist first decides upon the maximum number of successful executions necessary to trigger a reward, e.g., 5. Then the psychologist divides the range spanning from 1 event to the maximum number into units. In the present example, units could be 1, 2, 3, 4 and 5. Next, a random number generating scheme chooses at random a first unit from those available. Perhaps the random number generating scheme produces a number in the fourth quintile of possible random outcomes. Then, in this particular example, the corresponding unit "4" would be chosen. The patient would be required to complete four targeted behavior events before receiving a reward. The psychologist runs the random number generator again to identify another quintile at random. Perhaps the second run gives the second quintile as a result corresponding to unit "2". The patient then must complete two more targeted behavior events before obtaining the next reward. The psychologist continues to generate random selections of units to produce a series of randomized numbers of targeted behavior events necessary to trigger rewards. The frequency of rewards to number of targeted behavior events can be adjusted by changing the correspondence between random number outcomes and units in the range. To explain further, assume that the random number generator has 100 possible outcomes in a range from 1 to 100 as in the previous example. By way of example, the designer could relate outcomes 1–50 to unit 1 and outcomes 91–100 to unit 5. Thus half of the random events will order a reward after only one successful behavior event and five events will be needed to get a reward for only one tenth of the random events.

This example algorithm has the potentially advantageous characteristic that the patient is guaranteed to be scheduled for a reward after the maximum number of successes. However, it also presents a possible shortcoming in that the patient will know in advance that the next successful event will generate a reward when the patient has successfully completed one less than the maximum number.

Methods for generating true or pseudo-random numbers are well known to those of ordinary skill in the art. Other methods of determining whether to grant a reward based on a random event are also well known. Thus, any of the established algorithms may be used to randomize the grant of rewards for a given number of events resulting in a fixed or a variable reward to event frequency.

A representative method of designing a novel device for scheduling reinforcements in a behavior modification program according to this invention will now be described. To produce the device one predetermines the reward to targeted behavior event frequency. Preferably the frequency should be within the range of 1:2 to about 1:24. Then utilizing the reward to event frequency and a randomization algorithm, the psychologist can carry out a simulation involving a number of independent trials, e.g., 5, 10, 50, 200, 1000, or any other numeric value chosen by the psychologist to provide a convenient number of reinforcement instructions for the device being produced. As a result of these trials a string of "grant reward" or "deny reward" outcomes is generated. The string of results might be encoded in a form such as follows: G, G, G, D, G, D, D, G, D, G, D, D, D, D, G . . . in which the code mark "G" represents "grant reward" and the code mark "D" represents "deny reward". The reward to event frequency for this particular sequence is 7:15. The code marks may be represented in any understandable form of words, numbers, colors or symbols, such as stars, dots, triangles, circles or any convenient and distinctive geometric shape.

The code marks are then transferred onto an indicating surface on a base of the device according to this invention. It can be helpful to consider the indicating surface of the base as being divided into numerous locations at fixed positions. Each location corresponds to a sequence number within a series of events in which the patient is challenged and demonstrates the desired, targeted behavior. The device is also equipped with a mask comprising an opaque material positioned over the indicating surface in such a way that the code marks are initially hidden from view but may be selectively revealed by the patient manipulating the mask and/or base. Generally, the mask is designed so that one code mark is revealed at a time. Also the mask and locations of the code marks on the indicating surface are juxtaposed so that marks are revealed in order corresponding to the sequence that targeted behavior events are successfully executed. That is, after completing a first targeted behavior event, the device is manipulated to reveal a corresponding first code mark. The patient then discovers whether a reinforcement is awarded by inspection of the revealed mark. After completing a second targeted behavior event, the patient manipulates the device to reveal a corresponding second code mark and discovers whether a reinforcement is then awarded. After a third targeted behavior event, the third code mark is revealed, and so on. Because the instruction regarding the nature of reinforcement to be rewarded is predetermined by random selection, whether or not the patient will receive a reward is unpredictable to the patient until each code mark is revealed at the appropriate time.

The reinforcement scheduling device according to this invention can be implemented in a variety of specific forms. One embodiment can be understood with reference to FIGS. 1 and 2. Base 1 has an indicating surface 2. The indicating surface is subdivided by a grid. Grid lines 3 are shown for clarity of explanation but need not be present in the actual device. The grid subdivisions form cells labeled AJ, BJ, CJ, . . . GQ, HQ, and IQ. Cells BL . . . GO constitute locations at which code marks are placed. Identification of cells is also made for convenience of explanation and formal labeling of code mark positions on the indicating surface is not essential for the device. Cell BL is the location of the code mark of the reinforcement instruction corresponding to the first event to be successfully completed by the patient. Similarly, cell CL is the location of the code mark for the second successfully completed event, cell DL is the location of the code mark for the third such event, etc. Thus using the same hypothetical example, above, code marks G, D, D, G, D, G . . . G are placed respectively in cells AL, BL, . . . GO as shown in FIG. 1.

Figure 2:
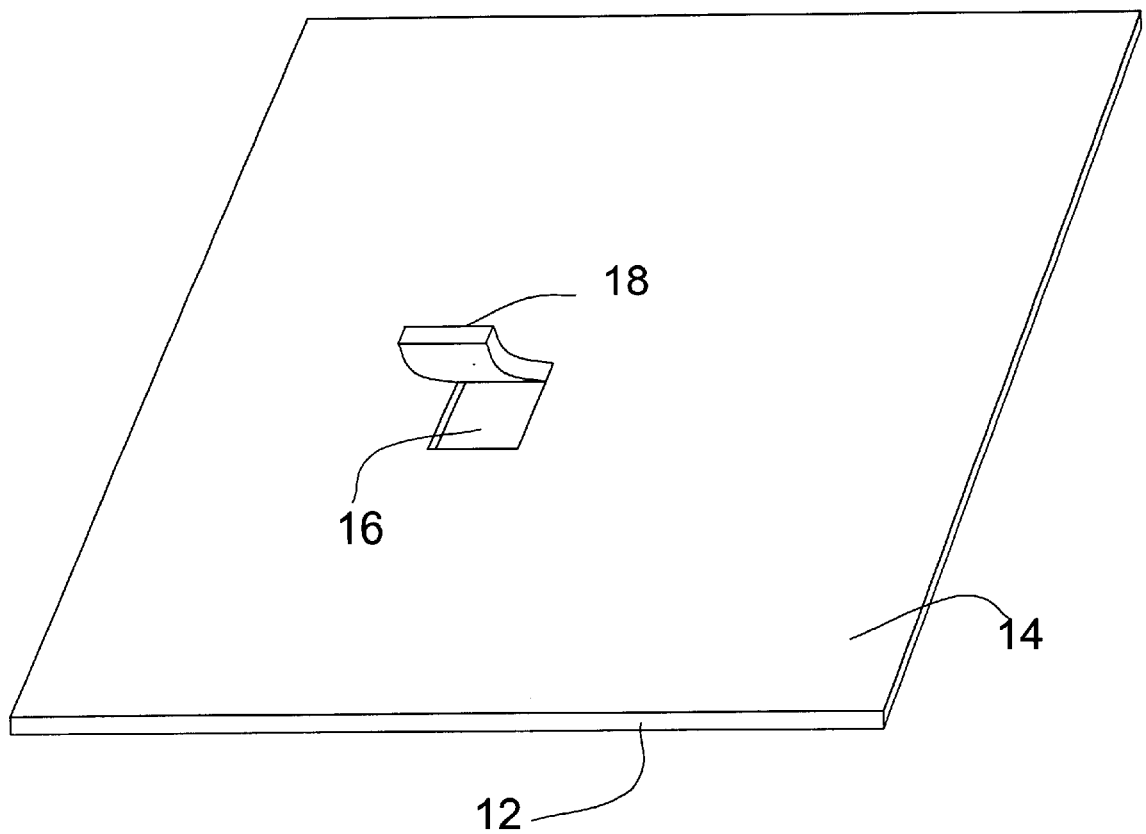
FIG. 2 is a perspective view of a mask operative for use with the behavior modification device of FIG. 1.

FIG. 2 illustrates a mask 12 to be used in combination with base 1 to make a behavior modification device according to this invention. Mask 12 is composed of a visibly opaque material 14 and includes a plurality of apertures, only one of which, namely 16, is shown. Aperture 16 includes a cover 18. When attached to base 1 the mask 12 becomes coextensive with the indicating surface 2. If covers over all apertures are closed, the mask blocks from view the underlying code marks at their respective locations on the indicating surface. If the cover of any aperture is removed, the underlying code is revealed. Accordingly, opening cover 18 for aperture 16 reveals to the patient's view the code mark at location DN on the indicating surface of the base in the illustrated embodiment. Location DN is the position of the code mark for the 15th result in the sequence of successful targeted behavior events. Thus in keeping with the earlier hypothetical example, opening cover 18 for aperture 16 exposes the code mark "G" at position DN. It should be apparent that the embodiment of the novel device illustrated in FIGS. 1 and 2 is utilized by marking the available positions of indicating surface 2 with a series of reinforcement instructions then placing mask 12 over the base with all covers initially closed to conceal the instructions. After the patient executes a targeted behavior event, a cover over the code mark at the location corresponding to that sequence number of events in the series is opened.

In the above described embodiment, the mask can be implemented as a framework defining a plurality of apertures within individual frames. In such implementation each frame is positioned over a different code mark location and each aperture is sized to expose at most one code mark. Every aperture has an independently operable opaque cover which is removable from its respective frame. In one aspect, the covers are not replaceable after removing. An example of such a non-replaceable cover system is one in which the mask comprises a film adhered to the base overlying the indicating surface. Such mask can be perforated in outline over individual code mark locations, much like perforated postage stamps in a sheet of stamps, so that sections of the film constituting covers over the locations can be torn away. In another example, the mask comprises a plurality of discrete covers formed of opaque "stickers" each being adhered to the indicating surface to cover at least one code mark. The stickers can be removed by peeling from the indicating surface. In still another example, the mask comprises a plurality of opaque patches, each of which covers at least one code mark. The patches are adapted to disintegrate when abraded e.g., by scratching with a rigid tool, such as the edge of a coin.

Optionally, the covers can be reversibly removable. Such a cover can thus move between a closed state that conceals the code mark at the location of the aperture and an open state that reveals the code mark at that location. Examples of reversibly removable covers include a hinged plate adapted to swing open and close as in FIG. 2, and a sliding plate retained in a track on the frame of the aperture and adapted to slide away from and over the location of a code mark.

Figure 3:
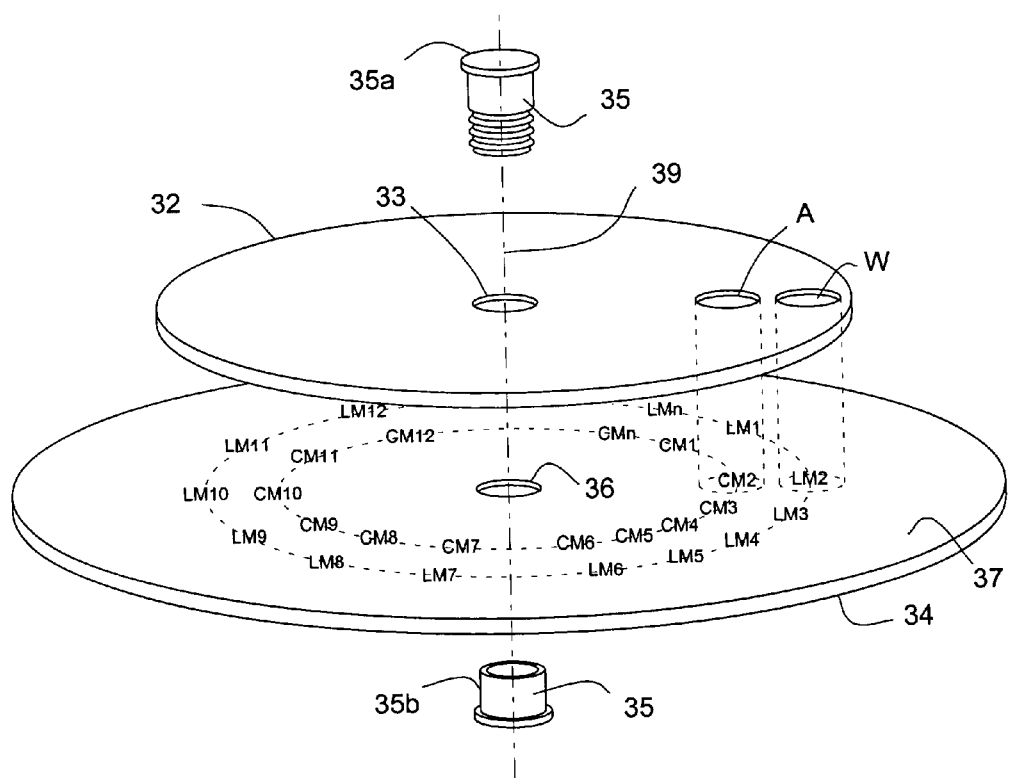
FIG. 3 is an exploded view of another embodiment of the device according to this invention.

A preferred embodiment of the novel reward scheduling device can be understood with reference to FIG. 3. In this embodiment the mask 32 is rotatably mounted on base 34. The mask and base are held in proximity by fastening means such as spindle 35 as shown having a top portion 35a and bottom portion 35b. In assembled form, the spindle 35 extends through center holes 33 of the mask and 36 of the base. Any equivalent fastening means, such as screw and bolt combination, adapted to permit axial rotation of the mask relative to the base is contemplated for use.

Mask 32 is cut out to provide locator window W and aperture A. Window W and aperture A are positioned at different radial distances from the axis 39 of rotation of the mask relative to the base. Although W and A are shown to be centered on the same ray originating from the axis 39 of rotation, they also may be angularly displaced from each other. Base 34 has an indicating surface 37 facing toward the mask 32. A plurality of code marks $CM_1$, $CM_2$, $CM_3$, etc. are disposed in a ring concentric on the indicating surface and are aligned with the opening of aperture A of mask 32. Similarly a plurality of locator marks $LM_1$, $LM_2$, $LM_3$, etc. are placed in another ring coaxial with the axis of rotation on the indicating surface. The locator marks are positioned to align with the opening of locator window W. Each locator mark is associated uniquely with a single code mark. The marks are placed on the indicating surface in such manner that when the mask is rotated to render each locator mark, e.g. $LM_n$, viewable through window W, respective code mark $CM_n$, corresponding to that particular locator mark is then visible through aperture A. The locator marks can be any type of symbol. Preferably, the locator marks identify the sequence number of the event to which the related code mark applies. That is, for the first code mark in the series, the locator mark might be "1", for the second code mark, the locator mark might be "2", and so on. Accordingly, the patient can align the mask and base to view through window W a locator mark identifying a successfully executed targeted behavior event and then read through aperture A the corresponding code mark that reveals the type of reinforcement, if any, to be rewarded.

Figure 4:
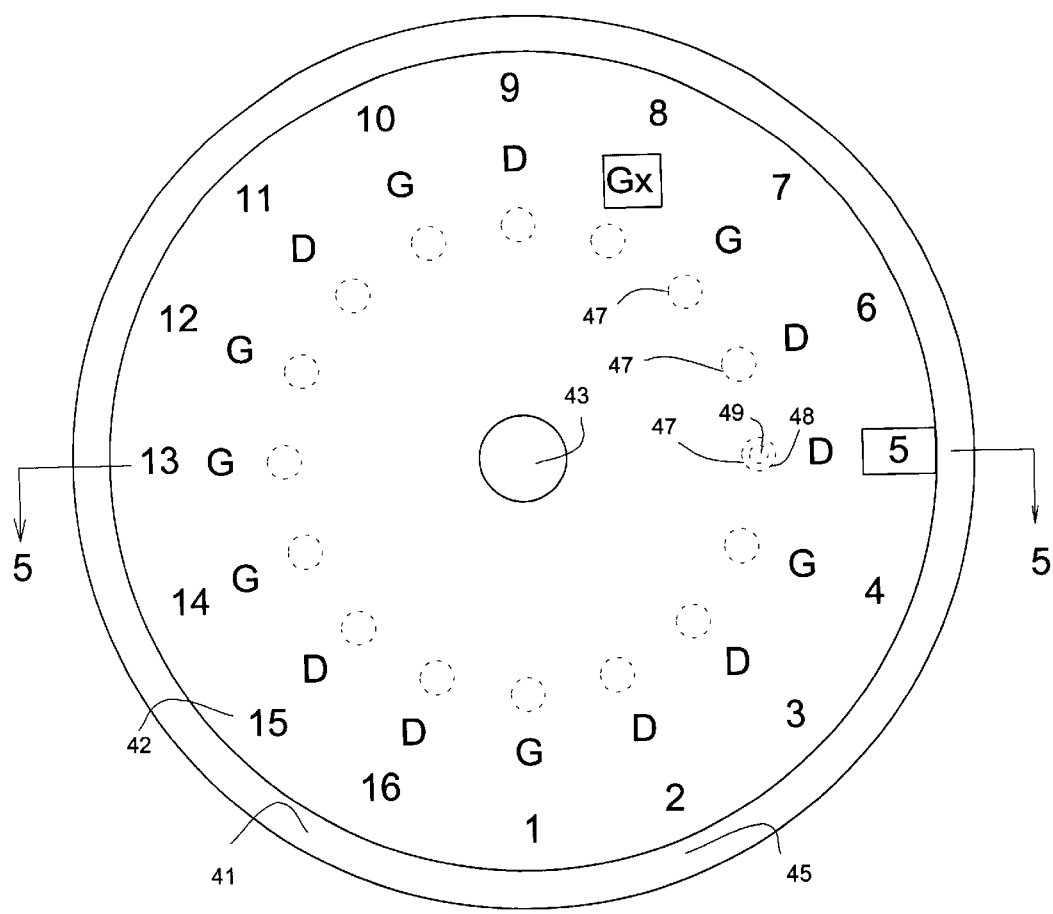
FIG. 4 is a top view of a rotating dial type device according to another embodiment of this invention.
Figure 5:
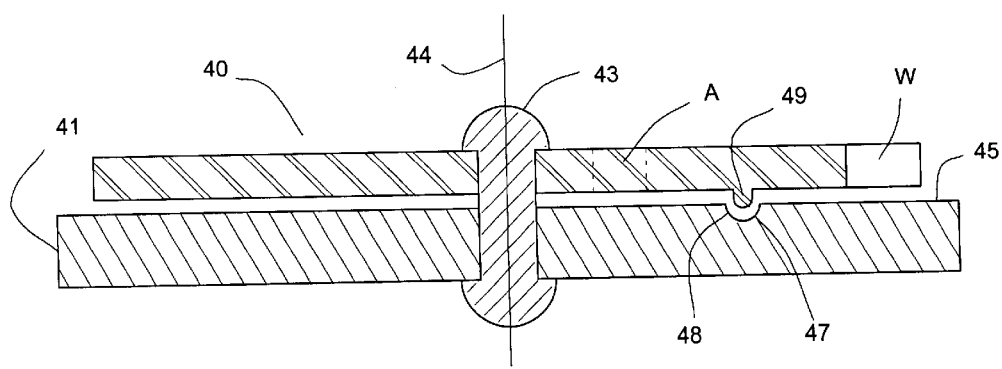
FIG. 5 is a section view of the rotating dial type device of FIG. 4 taken through line 5—5.
Figure 6:
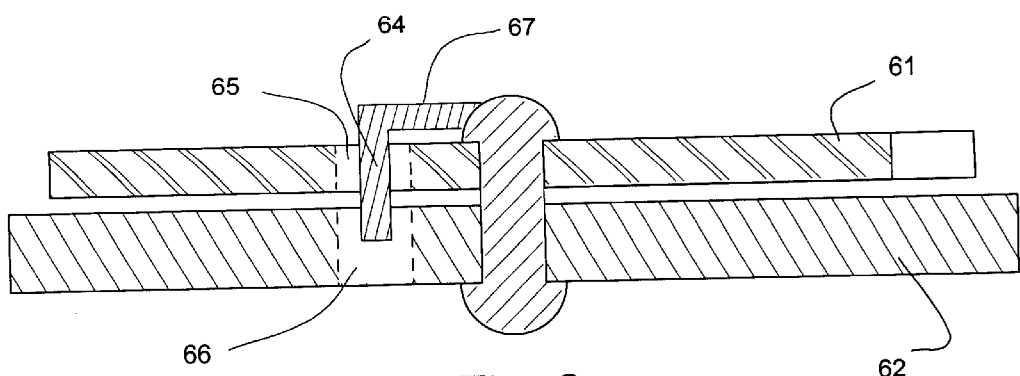
FIG. 6 is a section view of another embodiment of a rotating dial type device according to this invention.

Generally, mask and base are free to rotate 360° about their common axis with respect to each other. Relative movement between mask and base can be continuous. In another preferred embodiment, the mask and base can be constrained to move by incremental discrete relative angular displacements. These displacements can be indexed with positions of locator marks and code marks so that the mask and base resist rotation away from indexed positions that show marks through respective window W and aperture A. For example, as seen in FIGS. 4 and 5, the device 40 comprises a base disk 41, mask disk 42 and spindle 43. Base and disk are affixed to spindle 43 so as to permit rotation about axis 44. Locator marks, shown as the numerals "1" through "16" and code marks, shown as letters "G" and "D" are scribed onto indicating surface 45 of base 41. Mask 42 is opaque and blocks view of the scribed locator marks "1"–"4" and "6"14 "16" and code marks other than "Gx" which are shown in solid lines although being hidden by mask 42. The base includes a plurality of circular depressions 47 arranged in a ring about the central axis 44. For clarity, depressions 47 are shown only in phantom in FIG. 4 and only the depression 48 at the 3 o'clock position in FIG. 4 is shown in FIG. 5. Mask 42 also has a single protrusion 49 facing the base. By virtue of the fact that spindle 43 maintains base disk 41 and mask disk 42 in close parallel planar relationship, protrusion 49 is biased against indicating surface 45. The protrusion is radially positioned to extend into depressions 47 and is axially disposed so that the tip of the protrusion enters each depression as a locator mark and code mark appear respectively in window W and aperture A. This is exemplified in the illustrated embodiment by protrusion 49 inserting into depression 48 when mask and base are juxtaposed so that locator mark "5" is exposed by window W and corresponding code mark "Gx" is simultaneously revealed through aperture A. Hence, the patient must apply slight twisting force to spin the mask to each successive locator mark position at which point the protrusion will drop into the related depression. This feature advantageously renders the device easy for the patient to read. Furthermore once the protrusion sets into a depression, it advantageously maintains the mask and base in fixed relative position and thereby automatically stores the value of the most recently completed serial event. This frees the patient from having to independently note or memorize where in the series to start when the next targeted behavior event is executed. Equivalent mechanisms for constraining the motion of the mask and base to discrete angular displacements are contemplated. Representative examples include ratchet mechanisms and hole-and-peg systems. An example of the latter can include a peg 64 (FIG. 6) attached by a hinged or flexible link 67 to the spindle above the mask, a single hole 65 drilled through the mask 61 and a series of bore holes 66 (only one shown) drilled through the base 62 and arranged in a concentric ring radially oriented to coincide with the single hole. The patient can fix the mask-base position after each use by inserting the peg through the single hole and farther into the adjacent bore hole.

Figure 7:
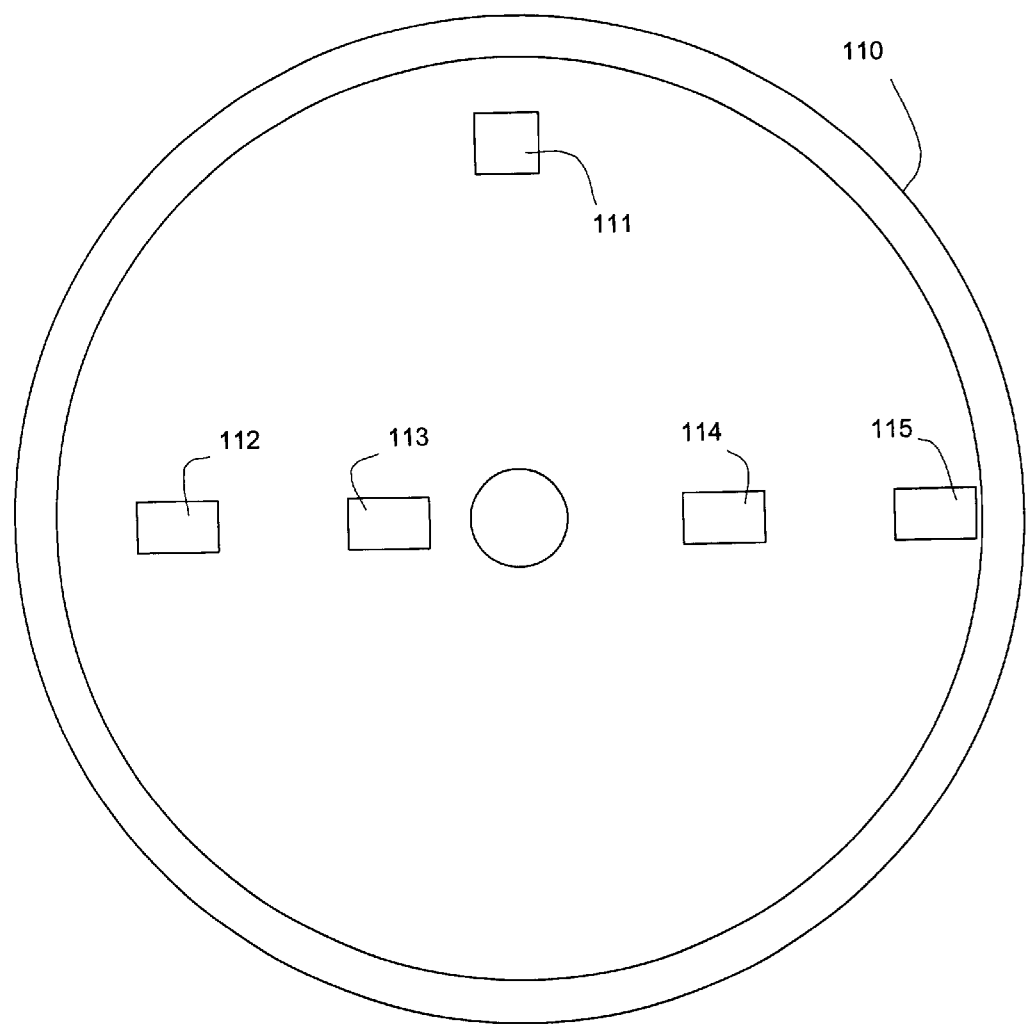
FIG. 7 is a top view of another embodiment of a rotating dial type device according to this invention.

Shape of the device is not critical. Although a circular shape is deemed to be particularly convenient for a mask and base that rotate about a common axis, any geometry can be used. Likewise, the shapes of the aperture and window may have any shape. The device is not limited to having only one window and one aperture. Other configurations are contemplated. For example, the embodiment of device 110 shown in FIG. 7 has one locator window 111 and four apertures 112–115. The apertures have hinged opaque covers. This embodiment allows the patient to check for four reinforcement instructions before having to reset the dial to a new locator mark. Similarly, the size of the novel device is not critical. The unit should be large enough that the aperture covers and other mechanisms are easily operable by the patient and that the locator marks and code marks are legible and understandable. If the device is too small, the marks may be too close together or too small to be read without difficulty. However, it is an important design feature that the device is portable, light weight, convenient to carry, store and use. Therefore, the area of the novel device preferably should be smaller than a standard, i.e., 8.5 inch×11 inch (21.6 cm×28 cm), sheet of paper, and more preferably, smaller than about 6 inches×6 inches (15.25 cm×15.25 cm). Preferably the device is thin enough (less than 1 cm thickness) to be carried in a pocket, briefcase or purse.

In another aspect, the present invention provides a system for randomized scheduling of administration of reinforcements in a behavior modification program. In a general sense, the system comprises a mask of opaque material defining one or more apertures and non-replaceable or replaceable covers over the apertures to first conceal and later reveal code marks on an accompanying base as described above. However, the system also includes a set of interchangeable bases. Each base has an indicating surface containing code marks adapted to provide reinforcement award instructions as previously described and the instructions associated with each base in the set is different from other bases in the set. For example, bases can be provided with different overall frequencies of reward to targeted behavior events. Accordingly, with such system a patient can begin a program with a very high frequency of rewards and successively decrease to high frequency, moderate frequency and low frequency as the patient adopts the targeted behavior more faithfully. Also, bases with the same frequency but with different random order of reinforcement instructions can be substituted from time to time. This advantageously prevents the patient from learning one pattern of reinforcements when the course of treatment is so prolonged that the cycle of rewards on a single base repeats. The system of this invention also provides the benefit that one set of bases can provide a psychologist with a broad range of reinforcement schedules. Thus the psychologist is virtually assured of having a randomized schedule suitable for treating patients having a wide variety of needs.

The interchangeable bases in the system of this invention can be easily installed in the device by the patient without direct assistance from the psychologist. That is, the psychologist can prescribe to the patient when to change reinforcement programs or, depending on the ability of the individual, the patient can select a base from a selection of interchangeable bases in a set to provide optimum treatment and results. The bases of a "dial" type device, such as device 40 (FIG. 3), for example, can be replaced by disassembling the spindle, removing an installed base, substituting a new base and re-assembling the spindle. A spindle of the type shown in FIG. 3 provided with mating screw threaded sections can be taken apart and re-assembled by unscrewing and re-screwing the upper and lower spindle portions.

The reward scheduling device of this invention can be provided to the patient with the mask and base initially separated and intended to be assembled by the patient prior to use. In this way, the patient can observe the relative frequency of rewards to expect before starting the behavior modification sequence. Because the sequence of rewards is coded, the patient will find it difficult, if not impossible, to memorize the specific instances when rewards will be granted. Still, the patient will have an approximate understanding of the amount of rewards to be received and may advantageously gain a sense of self control over the treatment process.

In other embodiments, the device can be provided with empty bases, i.e., without code marks specifically indicated. The psychologist can instruct the patient how to generate randomized reinforcement schedules and the patient can mark the bases accordingly. For example, the base can be composed of erasable dry marker board material on which the patient can place erasable code marks. Similarly, the base can be marked with blank code mark locations and the patient can apply peelable stickers onto the indicating surface of the base. After creating the code marks on the base, the patient then can mount an appropriate mask onto the base and commence to use the reinforcement scheduling device as instructed by the behavior modification program supervisor.

The invention has thus far been explained in context of scheduling only the grant or denial of rewards upon the execution of targeted behavior events. In addition, it can be used to schedule the amount of a reinforcing reward. For example, the psychologist of the behavior modification program can set up the device to indicate that a standard size, a fraction of standard size, multiples of standard size or variable size reinforcements will be awarded after randomized numbers of targeted behavior events are completed.

Although several embodiments of the invention have been selected, by way of example, for illustration in the drawings and the preceding description for the purpose of describing the invention to one of ordinary skill in the pertinent art, it should be understood that various substitutions and modifications or alternate embodiments which bring about substantially equivalent or superior results and/or performance are deemed to be within the scope and spirit of the preceding disclosure and the following claims.

I claim:

1. A device for scheduling administration of reinforcements in a behavior modification program in response to an individual completing an event in a series of events, the device comprising:

a base having an indicating surface;

a plurality of code marks, each code mark of which (i) is positioned at a location on the indicating surface and, (ii) uniquely corresponds to one event in the series, and in which the plurality of code marks comprises code marks indicating an instruction to grant a reinforcement and code marks indicating an instruction to deny a reinforcement; and a mask comprising an opaque material covering the indicating surface, in which the mask is operative to reveal each code mark consecutively in order of the event in the series to which each respective code mark corresponds, such that whether each code mark corresponds either to an instruction to grant a reinforcement or to an instruction to deny a reinforcement is unpredictable by the individual prior to revelation of each code mark.

2. The device of claim 1 in which the instruction to grant a reinforcement for each particular event is randomized in accord with a preselected reward to event frequency.

3. The device of claim 2 in which the reward to event frequency is in a range of 1:2 to about 1:24.

4. The device of claim 2 in which the mask defines at least one aperture of size and position on the mask to reveal by visual inspection through the aperture at most one code mark.

5. The device of claim 4 in which the mask defines one aperture at each location and comprises a cover over each aperture operable by the individual to reversibly move between a closed state that conceals the code mark at the location of the aperture and an open state that reveals the code mark at the location of the aperture.

6. The device of claim 4 in which the indicating surface further comprises one locator mark for each location of a code mark, the mask defines at least one locator window of size and position on the mask to reveal by visual inspection through the locator window at most one locator mark and in which the mask is operable to move in relation to the base to expose each locator mark through the locator window and to simultaneously reveal through the aperture the one code mark at the location corresponding to the locator mark then exposed by the locator window.

7. The device of claim 6 in which the mask is rotatably mounted on the base.

8. The device of claim 7 further comprising means for indexing the mask to preselected incremental displacements relative to the base.

9. The device of claim 2 in which the reinforcement is selected randomly from rewards of different magnitude.

10. The device of claim 1 in which the code marks are adapted to be modified by the individual.

11. A system for scheduling administration of reinforcements in a behavior modification program in response to an individual completing an event in a series of events, the system comprising:

a set of interchangeable bases, each base having an indicating surface;

a plurality of code marks on each indicating surface of each base in the set, each code mark of which is positioned at a location on the indicating surface of the base and uniquely corresponds to one event in the series; and a mask comprising an opaque material adapted to removably attach to all of the bases, the mask defining at least one aperture of size and position on the mask to reveal by visual inspection of the mask at most one code mark on a base attached to the mask, the mask further being operative to sequentially reveal each code mark in an order of the event in the series;

in which the plurality of code marks comprises code marks indicating an instruction to grant a reinforcement and code marks indicating an instruction to deny a reinforcement, in which the instructions to grant a reinforcement are randomized relative to the order of the event in the series; and in which the code marks for each base in the set provides a randomized order of reinforcements different from other bases in the set.

12. The system of claim 11 in which the code marks for instruction to grant a reinforcement are randomized in accord with a preselected award to event frequency and the preselected award to event frequency of each base is different from other bases in the set.

13. The system of claim 12 in which the reward to event frequency for each base is from 2:1 to about 1:24.

14. The system of claim 11 in which the reinforcement is randomly selected from rewards of different magnitude.

* * * * *

UNITED STATES PATENT AND TRADEMARK OFFICE
CERTIFICATE OF CORRECTION

PATENT NO.   : 6,722,886 B2  Page 1 of 1
DATED        : April 20, 2004
INVENTOR(S)  : Samuel H. Blumberg It is certified that error appears in the above-identified patent and that said Letters Patent is hereby corrected as shown below:

<u>Column 12,</u>
Line 14, delete "2:1" and substitute -- 1:2 -- therefor.

Signed and Sealed this

First Day of June, 2004

JON W. DUDAS
*Acting Director of the United States Patent and Trademark Office*